United States Patent [19]
Monahan et al.

[11] Patent Number: 5,094,363
[45] Date of Patent: Mar. 10, 1992

[54] INSULATED WATER BOTTLE FOR A BICYCLE

[76] Inventors: Timothy M. Monahan, 1919 Daisy Ave., Long Beach, Calif. 90806; Donald L. Millerd, 850 Plaza Toluca, San Digeo, Calif. 92067; Robert D. Bell, 1665 Chase Ave., El Cajon, Calif. 92020; David G. Kunze, 825 Klish Way, Del Mar, Calif. 92014; Michael Dekker, 11178 Adriatic Pl., San Diego, Calif. 92126

[21] Appl. No.: 553,730

[22] Filed: Jul. 16, 1990

[51] Int. Cl.$^5$ .................. B65D 37/00; B65D 47/00
[52] U.S. Cl. .................. 222/131; 222/210; 222/212; 222/523; 215/13.1
[58] Field of Search .......... 222/131, 210, 212, 523, 222/465.1, 545, 211, 215, 522, 525, 562, 182, 183; 220/411, 412, 413; 215/13.1, 6

[56] References Cited

U.S. PATENT DOCUMENTS

| | | | |
|---|---|---|---|
| 2,688,424 | 9/1954 | Keiter | 222/211 X |
| 4,170,316 | 10/1979 | LaBarbera | 222/182 X |
| 4,444,324 | 4/1984 | Grenell | 215/13.1 X |
| 4,549,410 | 10/1985 | Russell | 215/13.1 X |
| 4,664,288 | 5/1987 | Pereira et al. | 222/525 X |
| 4,702,473 | 10/1987 | Paquette | 222/210 X |
| 4,708,254 | 11/1987 | Burns | 215/13.1 |
| 4,720,023 | 1/1988 | Jeff | 220/411 X |
| 4,976,364 | 12/1990 | Solomon | 222/211 X |
| 5,022,562 | 6/1991 | Lurkis et al. | 222/182 |

FOREIGN PATENT DOCUMENTS

| | | | |
|---|---|---|---|
| 0276198 | 7/1988 | European Pat. Off. | 222/215 |
| 1013815 | 8/1952 | France | 215/13.1 |
| 0990011 | 4/1965 | United Kingdom | 215/13.1 |

OTHER PUBLICATIONS

*Taiwan Bicycles & Parts Buyers' Guide*, Trade Winds, Inc., pp. 382-383 (1987).
*Bicycling Magazine*, Aug. 1990 issue, pp. 26-27, article entitled "New Products—Beat the Heat".

Primary Examiner—Michael S. Huppert
Assistant Examiner—Anthoula Pomrening
Attorney, Agent, or Firm—Lyon & Lyon

[57] ABSTRACT

The present invention is directed to a squeezable insulated water bottle. In a preferred embodiment, the bottle has an outer shell of cylindrical shape with an opening at one end and a closed second end with an indented center shell portion dividing top and bottom shell portions, a layer of insulation material positioned about the inner surface of the top and bottom outer shell portions, and an inner liner of cylindrical shape having a neck opening. The outer shell, the inner liner, and the insulation layer are all made from flexible materials which allow the bottle to be insulated yet squeezable.

18 Claims, 2 Drawing Sheets

INSULATED WATER BOTTLE FOR A BICYCLE

BACKGROUND OF THE INVENTION

The field of the present invention relates to beverage bottles or more particularly, to a water bottle which may be supported by a hanging device mounted on a bicycle or the like.

There are many bicycle-type water bottles currently available on the market. The most popular water bottle design is a squeezable bottle of a generally cylindrical shape which can be readily grasped by the cyclist and removed from its cage which is mounted to the bicycle frame. Once in hand, a valve on the bottle is actuated and the cyclist squeezes the bottle to expel water out through the valve.

The typical water bottle is a cylindrical shaped vessel constructed from plastic and has a single shell wall. One drawback of such a single wall design is that such a construction provides poor insulation and liquid inside the bottle is undesireably warmed by the sun and the flow of hot air against the outside of the bottle. Alternately, if the bottle contains a hot liquid, it would be undesireably cooled by the flow of cold air against the outside of the bottle.

One solution is to provide a bicycle bottle of the thermos vacuum bottle design. Such a design, however, has the drawback of being inflexible. In addition, to maintain the desired maximum outer diameter (which would fit into the standard hanging device) such a vacuum bottle design has a relatively small inner volume for liquid.

Another bottle design (for keeping the liquid cool) includes an outer covering for the standard water bottle which is porous and can be dipped in water. Once moistened, the water in the moistened outer surface evaporates keeping the water inside cool. In such a design, the outer surface must be kept moist and when it dries out, it either becomes ineffective or must be inconveniently remoistened.

SUMMARY OF THE INVENTION

The present invention is directed to a squeezable insulated beverage bottle such as a water bottle for a bicycle. In a preferred embodiment, the bottle has an outer shell of cylindrical shape with an opening at one end and a closed second end with an indented center shell portion dividing top and bottom shell portions. A preferred insulation layer comprised of a sheet of insulation material is positioned about the inner surface of the top and bottom outer shell portions. An inner liner of cylindrical shape having a neck opening and an open first liner end is positioned inside the cylindrical outer shell such that the insulation layers are positioned between the inner liner and the outer shell. A portion of the inner liner adjacent the neck opening then is attached to the opening of the outer shell. The outer shell, the inner liner, and the insulation layer are all made from flexible materials which allow the bottle to be insulated yet squeezable.

DETAILED DESCRIPTION OF THE PREFERRED EMBODIMENT

A preferred embodiment will now be described with reference to the drawings. For ease of description, any numeral identifying an element in one figure will represent the same element in any other figure.

Figure 1:
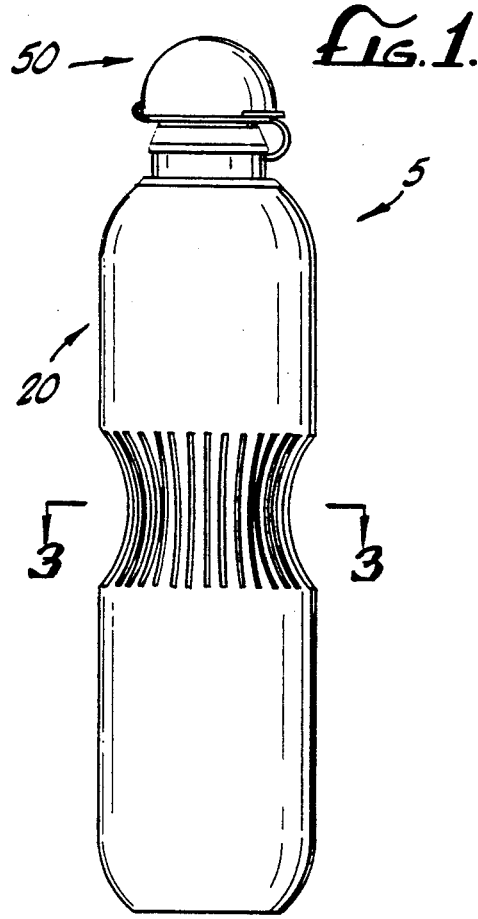
FIG. 1 is a side elevation view of a water bottle according to the present invention.
Figure 3:
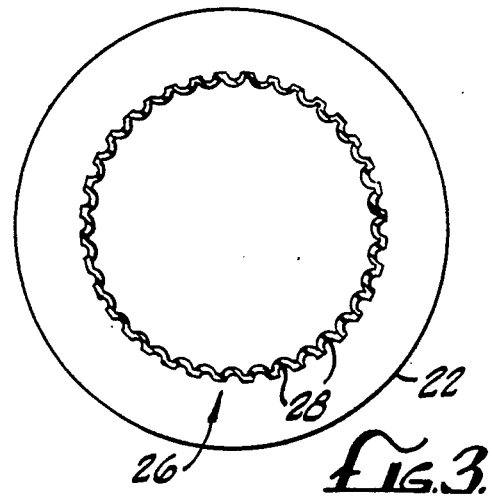
FIG. 3 is a cross-sectional view of the water bottle taken along the line 3—3 of FIG. 1.
Figure 2:
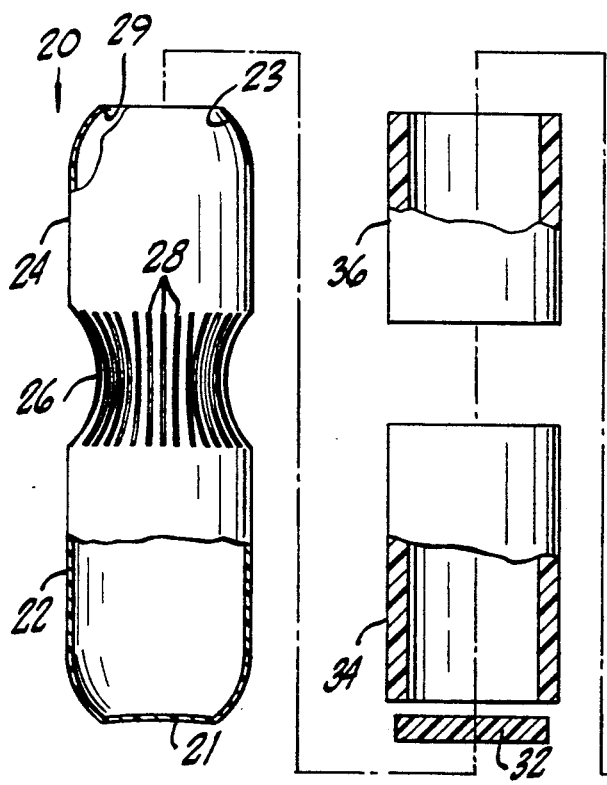
FIG. 2 is a side elevation assembly view of the water bottle of FIG. 1 in partial cross-section.
Figure 2:
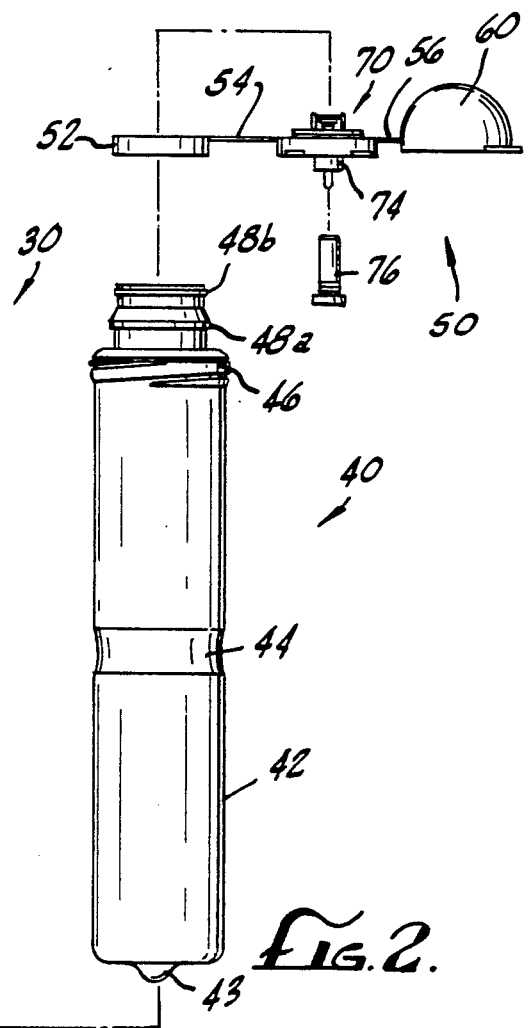

Referring the FIGS. 1-3, the water bottle 5 is comprised of an outer shell 20, a cap portion 50, an insulation layer 30, and a bottle liner 40. The outer shell 20 is of a cylindrical shape and constructed from a plastic material and of a wall thickness which is typical in the design of the standard squeezable water bottle. The outer shell 20 is comprised of an upper portion 24 and a lower portion 22 separated by an indented concentric central portion 26. The indented center portion 26 is a gradual indentation preferably without sharp corners. The outer shell 20 has a closed bottom end 21 and an open top end 23.

The insulation layer 30 is comprised of a bottom disc shaped piece 32 of insulation material which is positioned at the bottom of the outer shell 20 against the bottom end 21. A lower insulation portion 34 comprised of a cylindrically shaped sheet of insulation material is positioned in the lower shell portion 22 abutting the inner surface thereof. The upper insulation portion 36 is also comprised of a cylindrically shaped sheet of insulating material and it is positioned abutting the inner surface of the top portion 24 of the outer shell 20.

Fluid is contained within an inner bottle liner 40. The bottle liner 40 is of generally cylindrical shape with a flexible and preferably thin wall. The bottle liner is positioned inside the outer shell 20 forming an annular region therebetween. The insulation portions 34 and 36 are then positioned in this annular region between the inner liner 40 and the outer shell 20. The liner is water tight and has a neck opening 48 on one end thereof. The bottle liner 40 and the outer shell 20 have an attachment means for securing the bottle liner 40 within the outer shell 20. One such attachment means is illustrated as first and second corresponding threaded portions, one being the male threaded portion 46 on the bottle liner 40 adjacent to neck 48 and the other being the corresponding female threaded or open portion 29 along an inner surface of the outer shell 20 adjacent the opening 23. The bottle liner 40 is secured within the outer shell 20 by this thread combination.

The indented portion 26 of the outer shell 20 may include a plurality of longitudinal ribs or indentations 28 radially spaced about its perimeter. The ribs 28 serve several purposes. The ribs 28 provide a desirable gripping surface strategically located at the center of the bottle 5 where the cyclist grasps it. The ribs 28 also provide structural strength to help prevent collapse of the bottle in the gripping area.

A head assembly 50 including a valve portion 74 snaps onto the neck portion 48 of the bottle liner 40. Construction details of the preferred head assembly 50 will be described below, but the bottle 5 may be readily adapted by one skilled in the art to accept any suitable bottle head assembly and/or valve portion which may be snapped on, screwed on or otherwise connected to the neck portion 48.

The above construction of the water bottle 5 permits easy assembly either by hand or by automatic machine. A preferred assembly method will now be described. The outer shell is held in position and the bottom insulation piece 32 is inserted adjacent to the bottom 21 of the outer shell 20. The bottom insulation piece 32 may be pushed in by a rod or the like.

Figure 7:
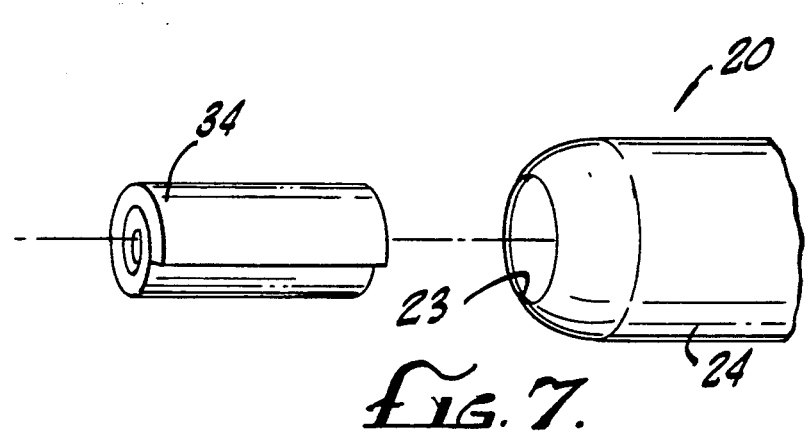
FIG. 7 is a schematic representing an assembly method for the insulation layer into the bottle shell.

The lower insulation piece 34 is comprised of a rectangular sheet of insulating foam material. To insert, the rectangular sheet 34 is rolled up as viewed in FIG. 7 much like a carpet may be rolled up. Once in the rolled up condition, the diameter of the lower insulation piece 34 is reduced and may be inserted into the opening 23 of the outer shell 20. The rolled-up lower insulation portion 34 is moved into position adjacent the lower bottle shell portion 22. Once in position, the rolled-up lower insulation piece 34 is released, and it should spring out and into place abutting the inner surface of the lower shell portion 22. The insulation piece 34 should be sized so as to have its longitudinal edges touching so that a continuous layer of insulation covers the entire circumferential inner surface of the lower shell portion 22. Preferably, the insulating material undergoes only minimal compression because insulation quality is diminished by compression of the insulating material.

Alternately, the bottom insulation piece 32 and the lower insulation portion 34 may be integrally formed in one piece, that is, a cylindrical shape with a closed end. To assemble, a rod may be inserted through the cylindrical shape and against the closed end thereby pushing the one-piece unit into position at the bottom 21 of the outer shell 20.

Next, the upper insulation portion 36 may be rolled up and then inserted into position abutting the inner surface of the upper portion 24 of the outer shell 20. The qualities and installation procedures are otherwise the same as for the lower insulation piece 34 and will not be repeated.

The bottle inner liner 40 is then inserted through the center of the now cylindrically-shaped upper and lower insulation portions 34 and 36. Once in position, the male threaded portion 46 on the inner liner 40 near the neck 48 is screwed into the female open portion 29 in the outer shell 20. The inner liner 40 may have a spacer bump 43 on the bottom thereof which acts as a spacer to maintain a space between the bottom end 21 of the outer shell 20 and the bottom of the inner liner 40. This spacer bump 43 establishes an air gap between the bottom end 21 of the outer shell 20 and the bottom of the inner liner 40. Such an air gap provides insulation qualities making the requirements of the bottom insulation piece 32 less necessary such that it may be omitted from the construction. The spacer bump 43 also provides axial support against the outer shell 20 both during assembly and during use such as when snapping on the dust cap 60.

Alternately, other insulation materials such as a foam-in-place polyurethane foam insulation may be employed. In such an insulation system, it would be preferred to minimize the amount of insulation at the indented center shell portion 26 to retain desired flexibility.

Once the bottle portion is assembled, the head assembly 50 may be installed. The head assembly 50 is comprised of a ring portion 52, a valve portion 70, and a dust cap 60. The valve portion 70 is connected to the ring portion 52 by a first hinge 54 and the dust cap 60 is pivotally attached to the valve portion 70 through a second hinge 56. The valve portion 70 may be a typical push-pull valve which is used on conventional bicycle water bottles.

To assemble, the ring portion 52 is inserted into position onto neck portion 48 over the lower lip 48a. In this condition, the bottle is open and may be readily filled. To complete assembly, the valve portion 70 is pivoted and snapped into place onto upper lip 48b. It should be noted that valve stem 76 would be initially assembled by being snapped into place within sleeve 74 of the valve portion 70. Finally, the dust cap 60 is pivoted and snapped into place onto the top of the valve portion 70.

Figure 4:
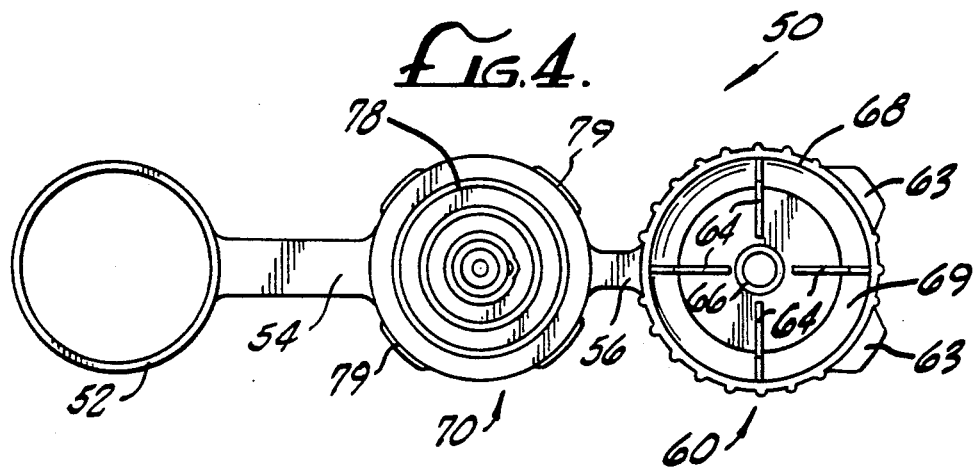
FIG. 4 is the top plan view of the valve means of FIG. 2 in the unassembled condition.

Details of the head assembly will now be described with reference to FIGS. 4, 5, and 6. The ring portion 52 is attached to the valve portion 70 by first hinge 54 and the valve portion 70 is pivotally connected to the dust cap 60 by a second hinge 56. The first and second hinges 54 and 56 are flexible connectors to allow pivoting of respective components into place. The valve portion 70 is comprised of a valve body 71 which snaps into position onto the upper lip 48b. The valve body 71 has an axially aligned sleeve portion 74 which is coaxial with the neck opening 48 when the valve body 71 is snapped in place thereon. The sleeve portion 74 has a bottom end extending inside the neck opening 48 and a top end extending up out of the neck opening 48. Positioned inside of the sleeve portion 74 is an inner stem 76 extending from the bottom of the sleeve portion 74 and extending upward past the top end of the sleeve portion 74.

The valve stem 76 is inserted into the annular passage formed between the sleeve portion 74 and the inner stem 72. The valve stem 76 is movable between (a) an open position (as shown in FIG. 5) with its bottom end separated from the bottom end of the cylindrical sleeve portion 74 thereby forming an annular passage 76a between the valve stem 76 and the inner stem 72 to provide communication from the interior of the bottle liner 44, through the annular passage 76a and out the valve stem 76 and (b) a closed position (as shown in FIG. 6) with the bottom of the valve stem 76 sealing against a seat in the bottom end of the cylindrical sleeve portion 74 closing off communication between the interior of the bottle and the annular passage.

The valve body 71 has a plurality of ears 79 extending radially outward and spaced about its outer perimeter. The ears 79 provide an interface for securing the dust cap 60 to the valve body 71.

Figure 5:
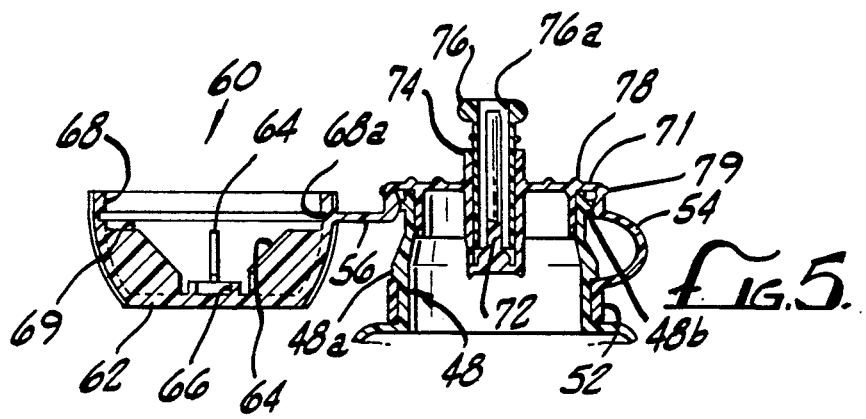
FIG. 5 is a detailed cross-sectional view of the valve means mounted on the bottle neck with the top portion in the open condition.
Figure 6:
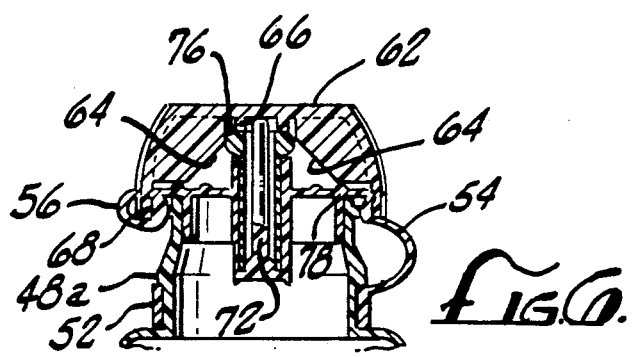
FIG. 6 is a detailed cross-sectional view of the valve means mounted on the bottle neck with the cap in the closed condition.

The dust cap member 60 is illustrated in FIGS. 5 and 6 as having a flattened head 62, but it may be rounded as in FIGS. 1 and 2. The dust cap member 60 has a rim 68 with an inner recess 68a which corresponds to and snaps over the ears 79 of the valve body 71. The dust cap 60 has a sealing surface 69 which comprises a shoulder extending readily inward from the rim 68. When the dust cap 60 is in the closed condition as in FIG. 6, the sealing surface or shoulder 69 engages a corresponding sealing rib 78 on the valve body 71. Therefore, when the dust cap 60 is in the closed position with the sealing surface shoulder 69 pressed against the sealing rib 78 in combination with the rim 68 in snap fit arrangement with the radially extending rib 71, a double seal arrangement is achieved to prevent entry of dust into the interior of the dust cap 60.

The dust cap 60 also includes a plurality of guide surfaces 64 disposed at an angle from the top center of the cap 60 towards the bottom of rim 68 within an inner face of the cap 60. These ribs provide structural strength to the cap 60 while maintaining a lightweight construction. When the dust cap 60 is moved to the closed condition, the ring seat 66 contacts a top surface of the valve stem 76 thus closing the valve if it were not previously in the closed position.

The dust cap 60 also has a pair of ears 63 extending radially outward from the rib portion 68 on the side opposite to the second hinge 56. The ears 63 provide a grip surface to facilitate removal of the dust cap 60.

Thus, a squeezable beverage bottle such as for a bicycle water bottle or the like has been shown or described. Though certain examples, uses and advantages have been disclosed, further advantages and modifications may become obvious to one skilled in the art from the disclosures herein. The invention therefore is not to be limited except in the spirit of the claims that follow.

What is claimed is:

1. A squeezable bottle comprising:
   a flexible inner liner of cylindrical shape having a neck opening at an open first liner end, a closed second liner end, and a first threaded outer surface portion at the first liner end;
   a flexible outer shell of cylindrical shape having a first shell end with an opening, a closed second shell end, an indented center shell portion dividing a top and a bottom shell portions, and a second threaded portion on an inside surface of the first shell end corresponding to the first threaded outer surface portion adjacent the first liner end;
   a flexible insulation layer positioned between the outer shell and the inner liner, the insulation layer comprising: (a) a lower insulation portion adjacent sides of the bottom shell portion and (b) an upper insulation portion adjacent sides of the top shell portion, the lower insulation portion and the upper insulation portion separated by a gap adjacent the indented center shell portion; and
   a valve means attachable to the neck opening.

2. A squeezable bottle as in claim 1 wherein the indented center shell portion of the outer shell is of reduced wall thickness to provide additional flexibility at the center shell portion of the outer shell.

3. A squeezable bottle as in claim 1 wherein the insulation layer further comprises (c) a bottom disk shaped portion for covering substantially all of the closed second shell end.

4. A squeezable bottle as in claim 3 wherein the bottom disk shaped portion and the lower insulation portion are integrally attached.

5. A squeezable bottle as in claim 1 wherein the inner liner includes an indented center liner portion.

6. A squeezable bottle as in claim 5 wherein the center liner portion of the inner liner is of reduced wall thickness to provide additional flexibility at the center liner portion of the inner liner.

7. A squeezable bottle as in claim 1 wherein each of the upper and lower insulation portions comprises foam-in-place insulating material.

8. A squeezable bottle as in claim 1 wherein each of the upper and lower insulation portions comprises a rectangular sheet of insulating material which is rollable into a cylindrical shape to conform to respective inside surfaces of the top and bottom shell portions.

9. A squeezable bottle as in claim 8 wherein each of upper and lower insulation portions has a pair of opposite longitudinal sides touching one another to form a continuous cylindrical shape.

10. A squeezable bottle as in claim 1 wherein the valve means comprises:
    a valve body with a push/pull valve stem, the valve means being in an open condition when the valve stem is in an extended outward position and in a closed condition when the valve stem is in an inward position;
    a dust cap attached to the valve body by a connector piece, the dust cap being pivotable into position to cover the valve stem, the dust cap having: (a) guide means along an inner face thereof which retracts the valve stem to the closed condition when the dust cap is positioned onto the valve body.

11. A squeezable bottle as in claim 10 wherein the valve body has a first circular sealing surface which corresponds to a second circular sealing surface on the inner face of the dust cap, the second circular sealing surface sealing against the first circular sealing surface when the dust cap is pivoted into position covering the valve stem to prevent entry of dust toward the valve stem.

12. A squeezable water bottle comprising:
    a flexible inner liner of cylindrical shape having a neck opening at an open first liner end and a closed second liner end;
    a flexible outer shell of cylindrical shape having a first shell end with an opening, a closed second shell end, and an indented center shell portion dividing a top and a bottom shell portions;
    a flexible insulation layer positioned between the outer shell and the inner liner, the insulation layer comprising: (a) a lower insulation portion adjacent sides of the bottom shell portion and (b) an upper insulation portion adjacent sides of the top shell portion, the lower insulation portion and the upper insulation portion separated by a gap adjacent the indented center shell portion;
    means for securing the first liner end of the inner liner to the first shell end of the outer shell; and
    a valve means attachable to the neck opening.

13. A squeezable water bottle as in claim 12 wherein the insulation layer further comprises (c) a bottom disk shaped portion for covering substantially all of the closed second shell end.

14. A squeezable water bottle as in claim 12 wherein each of the upper and lower insulation portions comprises foam-in-place insulating material.

15. A squeezable water bottle as in claim 12 wherein each of the upper and lower insulation portions comprises a rectangular sheet of insulating material which is rollable into a cylindrical shape to conform to respective inside surfaces of the top and bottom shell portions.

16. A squeezable water bottle comprising:
    a cylindrically shaped flexible shell with (a) a first shell end with a neck opening and (b) a closed second shell end; and
    a valve means comprising
        a ring-shaped connector portion attachable around the neck opening,
        a valve body with a push/pull valve stem attached to the ring-shaped connector portion by a first flexible connector piece, the valve body being pivotable into position to fit over and close off the neck opening, the valve means being in an open condition when the valve stem is in an extended outward position and in a closed condition when the valve stem is in an inward position, and a dust cap attached to the valve body by a second flexible connector piece, the dust cap being pivotable into position to cover the valve stem, the dust cap having: (a) guide means along an inner face thereof which retracts the valve stem to the closed condition when the dust cap is positioned onto the valve body.

17. A squeezable water bottle as in claim 16 wherein the valve body has a first circular sealing surface which corresponds to a second circular sealing surface on the inner face of the dust cap, the second circular sealing surface sealing against the first circular sealing surface when the dust cap is pivoted into position covering the valve stem to prevent entry of dust toward the valve stem.

18. A squeezable water bottle which may be supported by a hanging device on a bicycle, the bottle comprising:

a flexible inner liner having a neck opening at an open first liner end and a closed second liner end;

a flexible outer shell having a first shell end with an opening, a closed second shell end, and an indented center shell portion dividing a top and a bottom outer shell portions, said indented center shell portion being of smaller diameter than that of both the top and bottom outer shell portions for facilitating squeezing of the flexible inner liner;

a flexible insulation layer positioned between the outer shell and the inner liner, the insulation layer comprising: (a) a lower insulation portion adjacent sides of the bottom shell portion and (b) an upper insulation portion adjacent sides of the top shell portion;

means for securing the first liner end of the inner liner to the first shell end of the outer shell; and a valve means attachable to the neck opening.

* * * * *